INVENTOR.
Gerald DeClaire
BY
Harness & Harris
ATTORNEYS

United States Patent Office 3,301,613
Patented Jan. 31, 1967

3,301,613
DAMPED RESILIENT BEARING MOUNTING
Gerald DeClaire, Allen Park, Mich., assignor to Chrysler Corporation, Highland Park, Mich., a corporation of Delaware
Filed July 12, 1963, Ser. No. 294,522
3 Claims. (Cl. 308—26)

This invention relates to improvements in a bearing mounting and in particular to means for mounting the bearing of a high-speed rotating shaft subject to unusual vibrational forces, as for example, the air compressor shaft of an automotive gas turbine engine.

Although the invention is not limited to use with a gas turbine engine, in one application a high speed rotating shaft is secured at opposite ends to the hub of a radial air compressor and to the hub of a first stage gas driven turbine rotor, whereby the peripheral portions of the compressor blades are driven at supersonic speeds. The shaft is journaled adjacent each hub in a bearing assembly.

An object of the invention is to improve at least one of the bearing assemblies to provide means for lubricating the bearing and damping high speed vibrations transmitted thereto from the rotating shaft as well as for damping vibrations from the engine housing to the shaft via the bearing assembly.

In a preferred construction, the damping and lubricating bearing assembly comprises an inner annular journal for the rotating shaft and an annular outer thrust bearing having the inner journal pressed coaxially thereinto. The bearing assembly is confined within an annular cavity in a bearing housing mounted in the engine housing, such that outer portions of the thrust bearing are confined with clearance in the bearing housing. Similarly axial portions of the thrust bearing are confined with bearing clearance between annular thrust bearing portions of the rotating shaft. A suitable annular shielding space for lubricating fluid is provided between the outer circumference of the bearing assembly and the bearing housing to isolate the bearing assembly from its support. A pair of axially spaced annular O-ring seals of elastic or resiliently deformable rubber-like material, having a comparatively low spring rate with respect to the magnitude of the maximum vibratory forces transmitted by the rotating shaft during operation, are interposed within said space under compression and in fluid sealing engagement with the bearing housing and bearing assembly entirely around the latter. Conduits in the bearing housing and bearing assembly conduct pressurized lubricating fluid from a suitable pressure source to the portion of the space between said O-ring seals and thence to the journal bearing to lubricate the same.

By virtue of the O-rings in cooperation with the viscosity of the lubricating fluid in said shielding space, a well lubricated stable damped low spring rate support is provided for the bearing assembly which substantially isolates the same from the bearing housing to prevent interchange of vibratory forces therebetween.

Other objects of this invention will appear in the following description and appended claims, reference being had to the accompanying drawings forming a part of this specification wherein like characters designate corresponding parts in the several views.

FIGURE 3 is an enlarged portion of FIGURE 2, illustrating details of the bearing support.

It is to be understood that the invention is not limited in its application to the details of construction and arrangement of parts illustrated in the accompanying drawings, since the invention is capable of other embodiments and of being practiced or carried out in various ways. Also it is to be understood that the phraseology, or terminology employed herein is for the purpose of description and not of limitation.

Figure 1:
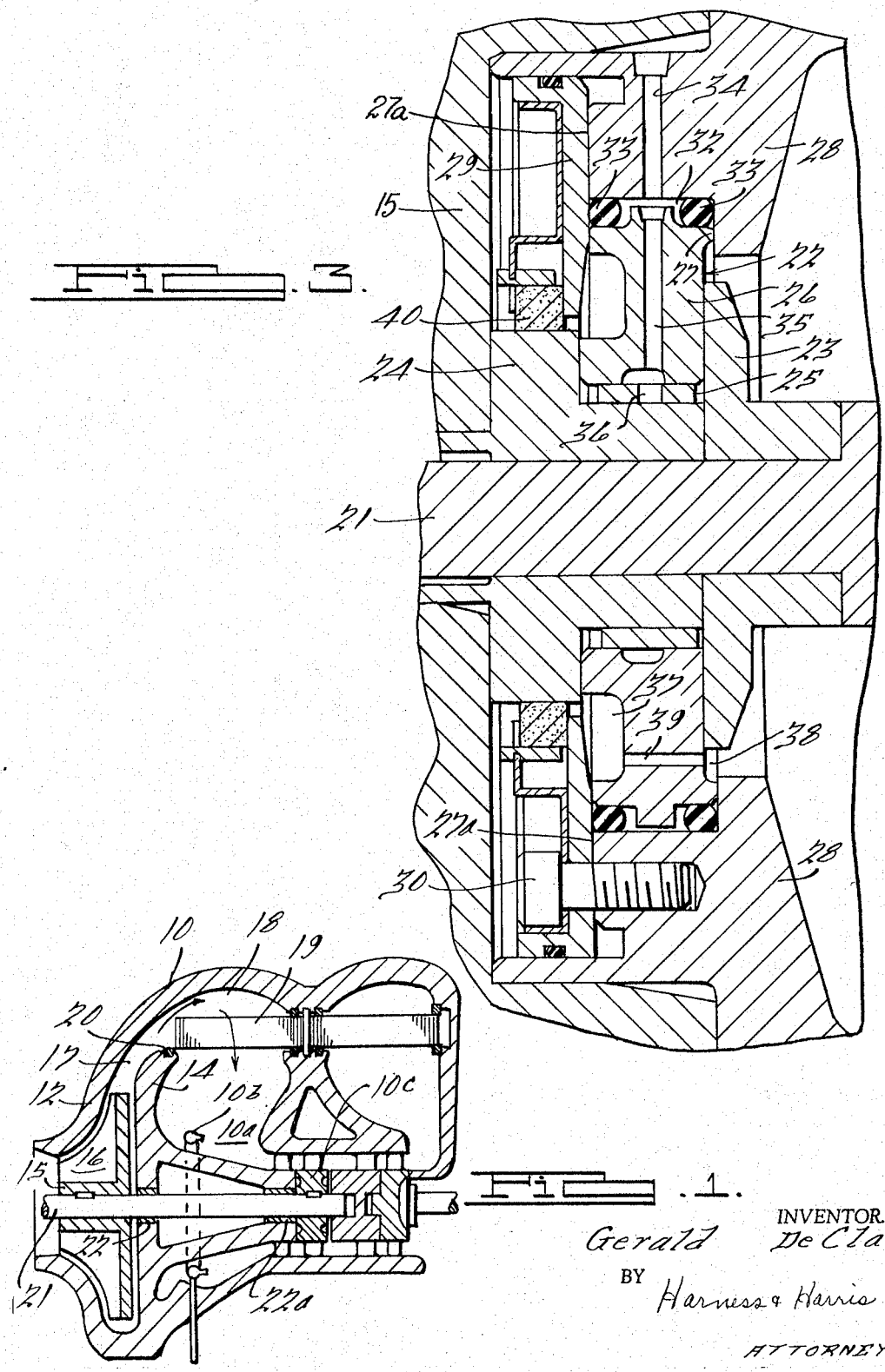
FIGURE 1 is a schematic axial sectional view through a gas turbine engine embodying the present invention.
Figure 2:
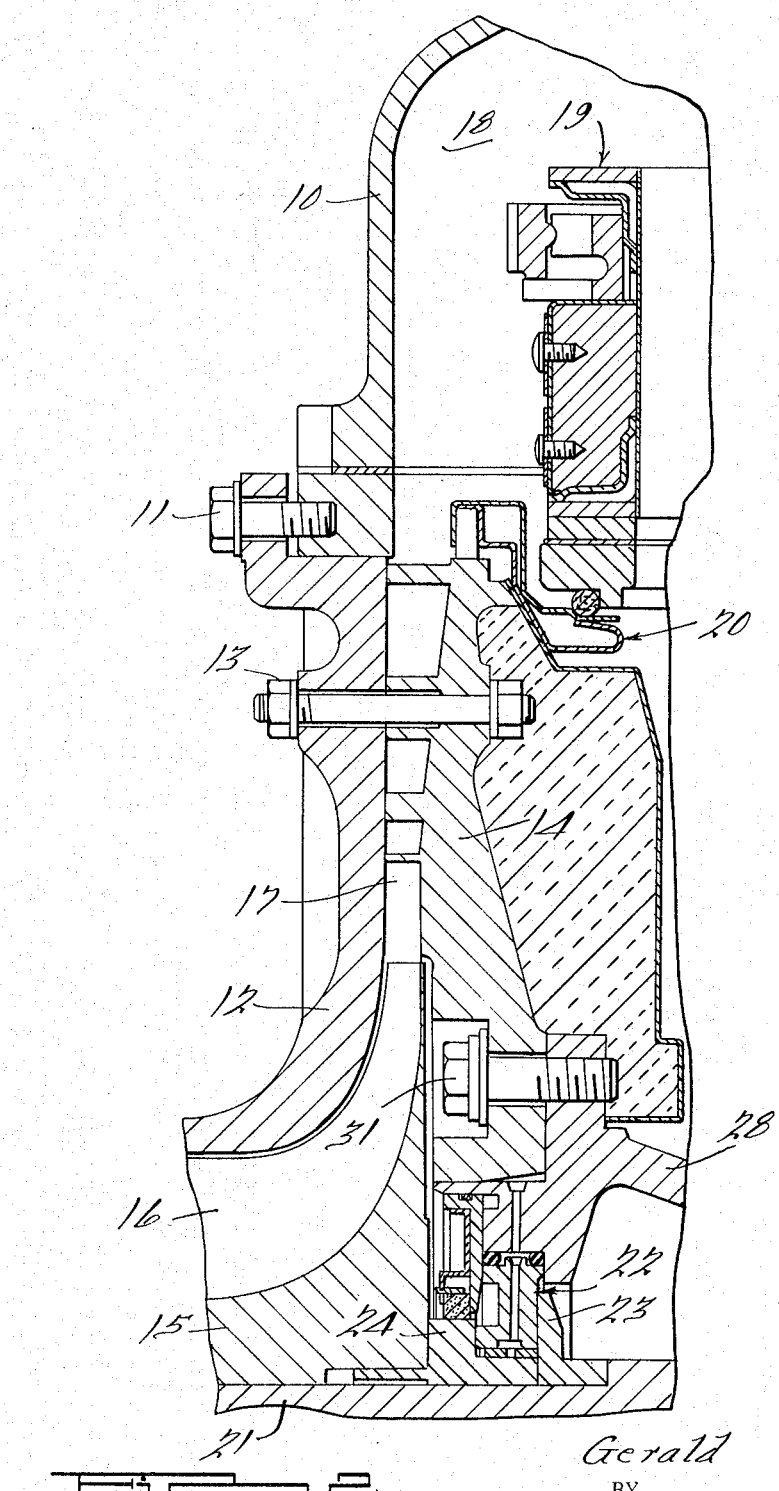
FIGURE 2 is a fragmentary enlarged sectional view through the rotating shaft and bearing housing of the gas turbine engine of FIGURE 1, taken longitudinally of the axis of the shaft.

Referring to the drawings, a portion of an automotive gas turbine engine is illustrated by way of example comprising an outer engine housing shell 10, FIGURE 2, secured by bolts 11 to an annular outer wall 12 of a compressor housing. The latter is secured by bolts 13 to an inner diffuser wall 14 associated with the outlet of a radial flow air compressor having a central hub 15 and a plurality of integral circumferentially spaced blades 16. Upon rotation of the hub 15 and blades 16, air is discharged radially from the compressor into a spiral diffuser 17 located between the walls 12 and 14 and is thence discharged into a regenerator chamber 18 within shell 10. A regenerator 19 rotatable within chamber 18 is arranged for axial flow therethrough of the gases from the upper part of chamber 18, whereby the gases are preheated and thereafter conducted by a suitable duct system to a combustion chamber 10a, FIGURE 1. In the combustion chamber, fuel is added at 10b to the preheated air and burned to provide the hot motive gases which are then conducted to a first stage turbine rotor 10c to drive the same in accordance with customary practice. A suitable seal 20 prevents admixture of the gases in chamber 18 with the hot preheated gases discharged from the regenerator 19.

The compressor hub 15 is keyed to a rotating shaft 21 having its other end keyed to the aforesaid first stage rotor to be driven thereby so as to rotate the outer peripheral portions of the compressor blades 16 at supersonic speeds.

A bearing assembly indicated generally by numeral 22 is provided for shaft 21 adjacent the hub 15 and is confined between a thrust bearing 23 and a reaction thrust bearing 24 which are keyed to shaft 21 to rotate therewith, FIGURES 2 and 3. The assembly 22 includes an annular journal or bushing 25 and an outer thrust bearing 26. The bushing 25 has an axial extension of bearing 24 journaled coaxially therein. The annular outer thrust bearing 26 has the bushing 25 pressed tightly therein. The inner axial portions of thrust bearing 26 are confined with suitable bearing clearances between the annular rotating bearings 23 and 24 of shaft 21, whereas the outer axial portion of thrust bearing 26 is similarly confined between an annular fixed shoulder 27 of bearing support 28 and an annular retainer 29. The latter is secured by bolts 30 to a second annular shoulder 27a of support 28, the shoulders 27 and 27a extending in parallel planes perpendicular to the axis of shaft 21 and spaced sufficiently to provide clearance of approximately .005" for thrust bearing 26, thereby to isolate bearing 26 and support 28 from each other to reduce the transmission of the radial components of vibrational forces therebetween. The support 28 itself is secured to the inner diffuser wall 14 by a plurality of circumferentially spaced bolts 31 and may carry a supplementary bearing 22a for the shaft 21 adjacent the first stage turbine rotor.

The cooperating bearings 23, 24 and supports 27 and 29 define an annular cavity containing the bearing assembly 22, the support 28 being spaced radially from the outer periphery of bearing assembly 22 to provide an annular lubricating oil chamber 32 containing a pair of axially spaced elastic or resiliently deformable O-rings 33 of rubber-like material located adjacent the axially opposite ends of bearing 26 under radial compression between the latter and support 28.

Lubricating fluid is supplied to chamber 32 through a duct 34 in support 28 and communicating with a suitable pressure source, as for example an engine driven lubricating pump. Radial ducts 35 and 36 within bearings 26 and 25 respectively conduct the lubricating fluid from chamber 32 to the portion of bearing 24 journaled within bushing 25. Bearing clearance between bearings 24 and 25 and between bearings 23, 26 and 24, 26 allows metered flow of lubricating fluid from duct 36 axially along the inner surface of bearing 25 and thence radially along bearing 26 into oil collecting groove 37 and into oil drain passage 38 at the axially opposite ends of bearings 26. The groove 37 is connected by an axial duct 39 in bearing 26 with passage 38 which in turn returns the lubricating fluid to the pressure source.

An annular graphite oil seal 40 of rectangular cross section is provided around bearing 24 adjacent the inner periphery of retainer 29 to block axial leakage of fluid from drain groove 37. Suitable clearance is provided between the inner circumference of seal 40 and the adjacent portions of bearing 24 to prevent the transmission of radial vibratory forces through seal 40.

By virtue of the structure shown, the bearing assembly 22 is substantially completely isolated from the support 28 by the O-rings 33 and the oil filled space 32. The O-rings 33 provide damping by virtue of their inherent hysteresis and also seal the annular space 32 against axial leakage. The annular volume of oil in chamber 32 serves both as a transfer port between ducts 34 and 35 and also provides viscous damping for the system. The damping effect of the rings 33 is determined by their elasticity and hardness as well as by their cross-sectional and overall diameters, which factors are determined to achieve a relatively low spring rate damped support and lubricating means for shaft 21.

I claim:

1. In a damped resilient means for supporting and lubricating a rotating shaft, a housing having a cavity therein, a journal for said shaft comprising bearing means in said cavity, said cavity having an outer wall spaced radially from said bearing means to provide a shielding space around the latter and also having axially spaced confining walls closely adjacent axially opposite sides of said bearing means and spaced slightly axially therefrom sufficiently to enable said bearing means to float freely with respect to said housing and to reduce the transmission of radial forces between said bearing means and confining walls, means for damping vibrations transmitted between said housing and bearing means comprising a pair of axially spaced seals of elastic resiliently deformable material extending in said shielding space around said bearing means under compression between and in fluid sealing relationship with the latter and said outer wall, a conduit in said bearing means connecting said shielding space at a location between said seals with the radially inner portion of said bearing means adjacent said shaft to supply lubricating oil thereto, said means for damping also including means for conducting lubricating oil under pressure to said shielding space between said seals, the viscosity of said oil cooperating with said resilient seals to damp vibrations of said bearing means transmitted thereto from said shaft.

2. In the combination according to claim 1, said bearing means including an inner annular journal bearing to provide said journal for said shaft and also including a coaxial outer annular thrust bearing, said conduit extending radially through said journal and thrust bearings, said confining walls being spaced axially from the radially outer portion of said thrust bearing, a pair of axially spaced thrust bearings adapted to be carried by said shaft and confining axially opposite sides of the radially inner portions of the first named thrust bearing therebetween with bearing clearance sufficient to provide an oil leakage path between the cooperating thrust bearings and to reduce the transmission of radial forces from said pair of axially spaced thrust bearings to said first named thrust bearing.

3. In combination, a housing having a cavity therein, bearing means in said cavity and having a radially inner bearing, a rotating shaft journalled in said bearing, said cavity having an outer wall spaced radially from said bearing means to provide a shielding space around the latter and also having axially spaced bearing confining walls closely adjacent axially opposite sides of the radially outer portions of said bearing means and spaced slightly therefrom axially sufficiently to enable said bearing means to float freely with respect to said housing and to reduce the transmission of radial forces between said bearing means and bearing confining walls, means for damping vibrations transmitted between said housing and bearing means comprising a pair of axially spaced seals of elastic resiliently deformable material extending in said shielding space around said bearing means under compression between the latter and said outer wall in fluid sealing relationship therewith, a conduit in said bearing means connecting said shielding space at a location between said seals with said radially inner bearing to supply lubricating oil thereto, said means for damping also including means for conducting lubricating oil to said shielding space between said seals, the viscosity of said oil cooperating with said resilient seals to damp vibrations of said bearing means transmitted thereto from said shaft, thrust bearing means spaced radially from said housing to reduce the transmission of radial forces thereto and being carried by said shaft at the axially opposite sides of the radially inner portions of said bearing means and cooperating therewith in thrust bearing relationship to limit relative axial displacement between said shaft and bearing means, having lubricating oil leakage clearance between said shaft and bearing means respectively for conducting said oil axially along said shaft between the latter and said bearing and thence radially along said thrust bearing means between the latter and said bearing means, and oil drain means in communication with the oil leakage clearance between said bearing means and thrust bearing means at locations spaced radially outwardly from said bearing.

References Cited by the Examiner
UNITED STATES PATENTS

| 2,092,291 | 9/1937 | Olsen | 308—184 |
| 2,295,139 | 9/1942 | Topanelian | 308—26 |
| 2,602,009 | 7/1952 | Barlow et al. | 308—26 |
| 3,058,785 | 10/1962 | Steele | 308—9 |

FOREIGN PATENTS

| 796,926 | 6/1958 | Great Britain. |
| 837,270 | 6/1960 | Great Britain. |

MARTIN P. SCHWADRON, Primary Examiner.

DAVID J. WILLIAMOWSKY, Examiner.

R. F. HESS, Assistant Examiner.